United States Patent
Kuridza et al.

(10) Patent No.: US 10,203,009 B2
(45) Date of Patent: Feb. 12, 2019

(54) APPARATUS FOR THERMAL INSULATION ON AN ACTUATING APPARATUS FOR DISK BRAKES

(71) Applicant: Dr. Ing. h.c. F. Porsche Aktiengesellschaft, Stuttgart (DE)

(72) Inventors: Aleksandar Kuridza, Stuttgart (DE); Swen Zschocke, Wiernsheim-Serres (DE); Erik Ellenberger, Stuttgart (DE); Stefan Hartlieb, Filderstadt-Plattenhardt (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/637,580

(22) Filed: Jun. 29, 2017

(65) Prior Publication Data
US 2018/0010659 A1    Jan. 11, 2018

(30) Foreign Application Priority Data

Jul. 7, 2016 (DE) .......................... 10 2016 112 485

(51) Int. Cl.
*F16D 65/18* (2006.01)
*F16D 65/78* (2006.01)
*F16D 125/06* (2012.01)

(52) U.S. Cl.
CPC ........ *F16D 65/18* (2013.01); *F16D 2065/785* (2013.01); *F16D 2125/06* (2013.01); *F16D 2200/0004* (2013.01)

(58) Field of Classification Search
CPC .......... F16D 65/14; F16D 65/16; F16D 65/18; F16D 2065/785; F16D 2125/06; F16D 2200/0004

See application file for complete search history.

(56) References Cited

U.S. PATENT DOCUMENTS

| | | | | |
|---|---|---|---|---|
| 4,513,844 A | * | 4/1985 | Hoffman, Jr. | ....... F16D 65/0006 188/264 G |
| 4,581,985 A | * | 4/1986 | Villata | .................... F16D 65/84 188/264 G |

(Continued)

FOREIGN PATENT DOCUMENTS

| | | |
|---|---|---|
| DE | 8533587 U1 | 1/1986 |
| DE | 602005001819 T2 | 4/2008 |

(Continued)

OTHER PUBLICATIONS

German Search Report dated May 17, 2017 for corresponding German Patent Application No. 102016112485.0, with partial English translation, 10 pages.

*Primary Examiner* — Melanie Torres Williams
(74) *Attorney, Agent, or Firm* — RatnerPrestia

(57) ABSTRACT

An apparatus for thermal insulation on an actuating apparatus, which can be loaded with a pressure medium, of a disk brake having a piston which slides in a cylinder for the axial displacement of the brake linings against a brake disk, in particular a partially lined disk brake having an insulation body made from non-thermally conducting/poorly thermally conducting material for the insulation of the components of the actuating apparatus with respect to a brake lining. It is possible for a substantially circularly annular, metallic brake lining to be inserted into an insulation body which is made from ceramic material and separates the piston from the brake lining in a thermally insulating manner. The insulation body is configured with side faces which adjoin the circularly annular brake contact face so as to run toward the annular circumferential face in a convexly rounded manner in the direction of the piston.

20 Claims, 1 Drawing Sheet

(56) References Cited

U.S. PATENT DOCUMENTS

| | | | | |
|---|---|---|---|---|
| 5,031,511 A | * | 7/1991 | Villata | F16D 65/84 |
| | | | | 188/71.6 |
| 5,282,411 A | * | 2/1994 | Hirai | F02F 3/003 |
| | | | | 123/193.6 |
| 7,156,212 B1 | * | 1/2007 | Ciotti | F16D 55/228 |
| | | | | 188/72.4 |
| 9,441,690 B2 | * | 9/2016 | Burgoon | F16D 65/847 |
| 2008/0134879 A1 | * | 6/2008 | Hofbauer | F02F 3/0023 |
| | | | | 92/186 |

FOREIGN PATENT DOCUMENTS

| | | |
|---|---|---|
| EP | 0042156 A1 | 12/1981 |
| FR | 2495252 A1 | 6/1982 |
| WO | 2004059188 A1 | 7/2004 |

\* cited by examiner

APPARATUS FOR THERMAL INSULATION ON AN ACTUATING APPARATUS FOR DISK BRAKES

CROSS-REFERENCE TO RELATED APPLICATION

This application claims priority to German Patent Application No. DE 10 2016 112 485.0. filed Jul. 7, 2016, which is incorporated by reference herein in its entirety.

FIELD OF THE INVENTION

The invention relates to an apparatus for thermal insulation on an actuating apparatus, which can be loaded with a pressure medium, for a disk brake having a piston which slides in a cylinder for the axial displacement of the brake linings against a brake disk, in particular in the case of partially lined disk brakes having an insulation body made from non-thermally conducting/poorly thermally conducting material for the insulation of the components of the actuating apparatus with respect to a brake lining.

BACKGROUND OF THE INVENTION

The heat which is produced during braking as a consequence of the conversion of kinetic energy into thermal energy between the brake lining and the brake disk must not lead to an impairment of the braking performance. Therefore, thermal loading of the actuating apparatus (piston, cylinder, pressure medium) has to be avoided effectively. In the case of partially lined disk brakes, moreover, damage to the components can occur as a result of the high loading of the components and, in some circumstances, as a result of vibrations which are caused, for example, as a consequence thereof, which damage can influence the braking action unfavorably.

Different approaches to the problem have been disclosed by the prior art, in particular, for preventing temperature loading of the components of a brake system. Inter alia, WO 2004/059188 A1, which is incorporated by reference herein, discloses an actuating apparatus of multiple-piece construction for a partially lined disk brake, in which a thermal insulation element made from plastic or ceramic material is provided between the actuating piston and a metallic brake lining, into which thermal insulation element the metallic brake lining is embedded.

It is proposed in EP 0 042 156 A1, which is incorporated by reference herein, to integrate a block made from insulating material into the brake piston, to which block a disk-shaped covering made from stainless steel is fastened as the actual brake lining.

Finally, FR 2 495 252, which is incorporated by reference herein, discloses a brake piston of pot-like design with a brake lining carrier which is fastened thereto and into the pot-like cavity of which thermally insulating material is introduced on a large scale.

SUMMARY OF THE INVENTION

The braking apparatus described herein provides particularly effective thermal insulation with a construction which at the same time withstands very high loading for an apparatus which is characterized as above.

In accordance with a first inventive proposal, a metallic brake lining is received in an enclosing manner in a substantially annular insulation body which is made from ceramic material and can be inserted into the piston, the surface of the insulation body running so as to be rounded convexly toward its annular circumferential face.

An alternative solution of the invention is seen in the fact that an insulation body which is made from ceramic material and separates the brake lining with respect to the pistons can be inserted into a metallic, substantially annular brake lining which is configured with side faces which run onto the central brake contact face in a convexly rounded manner toward the annular circumferential face.

The brake lining is preferably manufactured from stainless steel in both alternative solutions.

Zirconium oxide is preferably likewise used as ceramic material for the insulation body in both proposed solutions.

It is particularly expedient to configure the brake lining so as to be circular, and to embed it into a circular insulation body which encloses the brake lining in an annular manner.

In the case of the alternative solution, the brake lining can be of substantially circularly pot-shaped configuration. Here, the insulation body of substantially circular configuration can be capable of being inserted into the pot-shaped depression of the metallic brake lining.

The brake lining and the insulation body should be capable of being inserted into the piston or should be fastened therein, in such a way that a thermal transfer to the piston and, in particular, to the pressure medium, etc. can be avoided entirely or as extensively as possible by way of extensive avoidance of direct transfers.

Advantages, features and details of inventive solutions for the thermal insulation on brake pistons arise from the following description of two alternative embodiments and using diagrammatic illustrations in this regard in the drawing. The described features and combinations of features, as shown in the following in the figures of the drawings, and the features and combinations of features which are described using the drawing can be used not only in the respectively specified combination, but rather also in other combinations or on their own, without departing from the scope of the invention in this way.

DETAILED DESCRIPTION OF THE INVENTION

Figure 1:
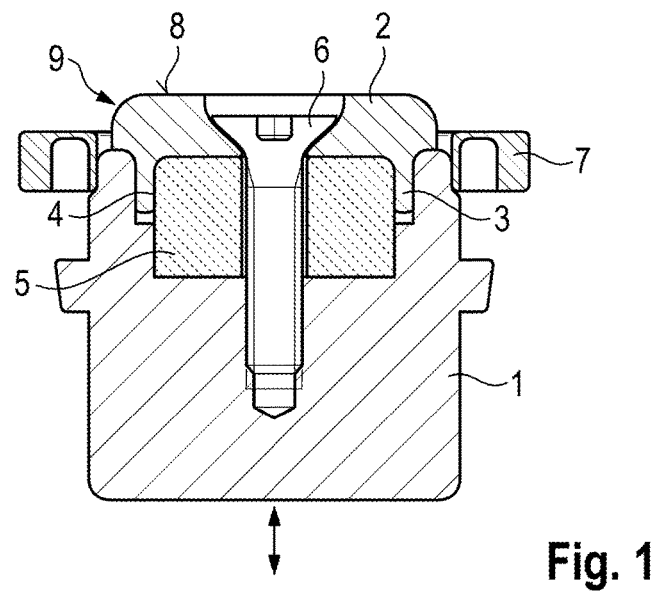
FIG. 1 shows a piston, which is constructed in accordance with the invention, for a disk brake with a brake lining and a thermal insulation body in section.

FIG. 1 uses 1 to show a piston for a disk brake which is actuated by pressure medium. As can be readily seen by a person skilled in the art, said piston 1 can be moved slidingly in the arrow direction in an axially movable manner in a cylinder (not shown) under the action of a pressure medium (for example, hydraulic oil), in order to move a brake lining 2, for braking, for example, a vehicle, for contact against a brake disk (not shown). Here, the brake lining 2 is of circular construction and is provided with a pot-shaped attachment 3 which can be formed integrally on the brake lining 2. An insulation body 5 is inserted into an opening 4 in the pot-shaped attachment 3. The brake lining 2 and the insulation body 5 can be fastened (preferably releasably) via a screw 6 or a similar connecting element in the piston 1.

The piston 1 is arranged in a brake piston housing 7 in a manner known per se. The brake lining 2 has a substantially centrally arranged brake contact face 8 which has side faces which run in a convexly rounded manner toward the annular circumferential face 9.

On account of said clear rounded nature of the brake lining 2 in its side regions, the build-up of heat as a result of friction is restricted substantially to the central region of the brake lining 2, with the result that at any rate scarcely any or at most only a small, non-critical heat transfer can take place into the piston 1 in its outer region. A heat transfer from the brake lining 2 to the piston 1 is ruled out effectively in the central region of the brake lining 2 or the screw 6 by way of the insulation body 5.

It is optionally conceivable to provide an additional insulation ring (not shown) in the region of the contact of the brake lining 2 for preventing thermal transfer in this region, in a manner which encloses the pot-shaped attachment 3.

Figure 2:
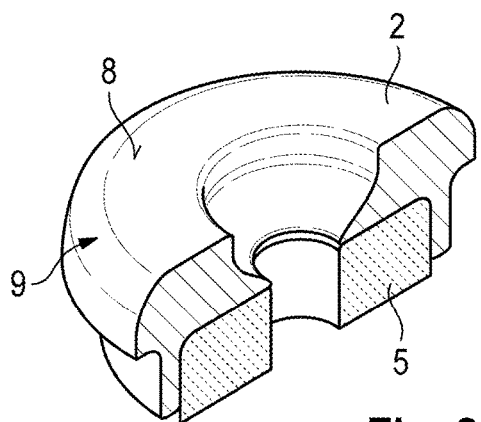
FIG. 2 shows a brake lining of pot-shaped configuration with an insulation body which is inserted into the receiving pot of the brake lining, in section in a perspective illustration.

FIG. 2 shows a perspective sectional illustration of the brake lining 2 and the insulation body 5 in accordance with the exemplary embodiment according to FIG. 1. As can be seen clearly from FIG. 2, the annular circumferential face 9, that is to say the transition region from the brake contact face 8 to the outer circumference of the brake lining 2, is configured so as to run in a clearly convexly rounded manner. This configuration prevents firstly that an increased pressure exists on the components of the actuating apparatus via the edges of the brake lining, for example, as a consequence of vibrations or in the case of oblique wear on the brake lining. Secondly, a cooling action can be achieved in said region by way of the distance between the brake disk and the brake lining (air gap).

The brake lining 2 is manufactured from a metallic material; gray cast iron or else stainless steel is preferably used for this purpose. A ceramic material is ideally applied as material for the insulation body 5; zirconium oxide has proven particularly suitable during tests of the inventive subject matter.

Figure 3:
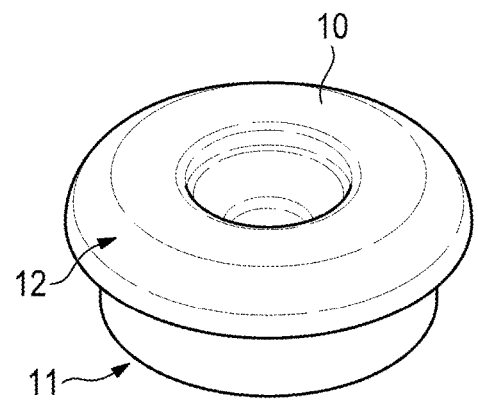
FIG. 3 shows a perspective view of an insulation body with a brake lining which is inserted therein (alternative embodiment to the illustrations in FIGS. 1 and 2)

FIG. 3 shows an alternative embodiment of the subject matter of the invention. Here, the brake lining is embedded in an insulation body 11 in an enclosing manner as a disk 10 of substantially annular configuration. The side faces of the insulation body 11 which adjoin the brake contact face of the brake lining 10 run from the annular circumferential face 12 of the insulation body 11 with a clear convex rounded nature in the direction of the piston (piston not shown).

Figure 4:
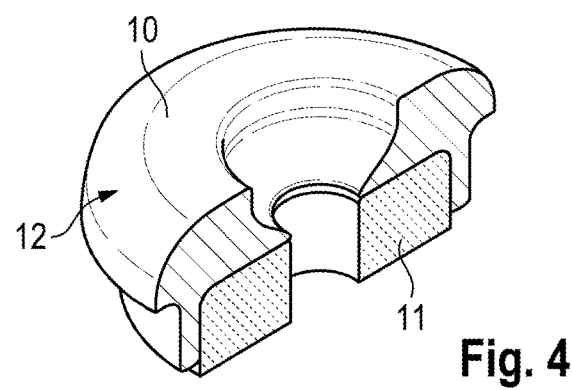
FIG. 4 shows a brake lining of pot-shaped configuration with an insulation body which is inserted into the receiving pot of the brake lining, in accordance with the embodiment according to FIG. 3, in section in a perspective illustration.

FIG. 4 in turn shows a perspective sectional illustration of the construction of the brake lining 10 and insulation body 11 with the greatly convexly running rounded portion on the annular circumferential face 12 according to FIG. 3.

In contrast to the above-described exemplary embodiment which is shown in FIGS. 1 and 2, the brake lining 10 in accordance with the exemplary embodiment according to FIGS. 3 and 4 consists of a metallic material, for example stainless steel, which is fastened merely as a centrally arranged ring in a manner which is embedded into the insulation body 11 which is placed on a sliding piston (not shown).

The insulation body 11 is manufactured from ceramic material, preferably from zirconium oxide.

In terms of the construction with its rounded edges on its annular circumferential face 12, the insulation body 11 with its advantages corresponds to the construction in accordance with the exemplary embodiment according to FIGS. 1 and 2.

LIST OF DESIGNATIONS

1 Piston
2 Brake lining
3 Pot-shaped attachment on 2
4 Opening of 3
5 Insulation body
6 Screw/connecting element
7 Brake piston housing
8 Brake contact face
9 Annular circumferential face
10 Brake lining/Annular disk
11 Insulation body
12 Annular circumferential face

What is claimed is:

1. An apparatus for thermal insulation on an actuating apparatus, which can be loaded with a pressure medium, of a disk brake having a piston which slides in a cylinder for axially displacing a brake lining toward a brake disk, the apparatus comprising:
   a metallic brake lining having a substantially circularly annular configuration, a brake contact face that is configured to be displaced toward the brake disk, and an outer edge extending from the brake contact face that is rounded convexly, wherein the metallic brake lining is configured to be inserted into the piston; and
   an insulation body, which is made from ceramic material, that is configured to be received in an enclosing manner in the metallic brake lining, wherein the insulation body extends in a direction of the axial displacement to a position beyond the metallic brake lining to contact the piston.

2. The apparatus as claimed in claim 1 wherein the metallic brake lining is stainless steel.

3. The apparatus as claimed in claim 1, wherein the ceramic material is zirconium oxide.

4. The apparatus as claimed in claim 1, wherein the metallic brake lining is configured as an annular disk and is configured to receive and substantially enclose the insulation body, which is circular.

5. The apparatus as claimed in claim 1, wherein the metallic brake lining is of substantially circularly pot-shaped configuration having a pot-like depression that is sized to receive a substantially circular insulation body.

6. The apparatus as claimed in claim 1, wherein the metallic brake lining and the insulation body are configured to be inserted into the piston in such a way that the piston is substantially insulated from the brake lining.

7. The apparatus as claimed in claim 1, characterized by its use in partially lined disk brakes for motor vehicles.

8. The apparatus as claimed in claim 1, wherein the metallic brake lining includes a pot shaped attachment that is positionable between the insulation body and the piston.

9. The apparatus as claimed in claim 1, the insulation body having a lower surface for contacting the piston and an opposite upper surface or contacting the metallic brake lining.

10. The apparatus as claimed in claim 1, the insulation body and the metallic brake lining each having an opening for receiving a fastener for fastening the insulation body and the metallic brake lining to the piston.

11. The apparatus as claimed in claim 10, the opening in the metallic brake lining being countersunk.

12. The apparatus as claimed in claim 1, the insulation body and the metallic brake lining together defining a stepped exterior facing surface which is positionable within a stepped interior surface of the piston.

13. The apparatus as claimed in claim 1, wherein the insulation body has a donut shape.

14. An apparatus for thermal insulation on an actuating apparatus which can be loaded with a pressure medium, of a disk brake having a piston which slides in a cylinder for the axial displacement of the brake linings toward a brake disk, the apparatus comprising:
  a substantially circularly annular, metallic brake lining; and
  an insulation body which is made from ceramic material and is configured to be inserted into the metallic brake lining and separates the piston from the metallic brake lining in a thermally insulating manner, the insulation body having a side face which adjoins a circularly annular brake contact face of the metallic brake lining so as to run toward an annular circumferential face of the metallic brake lining in a convexly rounded manner in the direction of the piston,
  wherein the insulation body extends in a direction of the axial displacement to a position beyond the metallic brake lining to contact the piston.

15. The apparatus as claimed in claim 14, wherein the metallic brake lining is stainless steel.

16. The apparatus as claimed in claim 14, wherein the ceramic is material is zirconium oxide.

17. The apparatus as claimed in claim 14, wherein the metallic brake lining includes a pot shaped attachment that is positionable between the insulation body and the piston.

18. The apparatus as claimed in claim 14, the insulation body having a lower surface for contacting the piston and an opposite upper surface for contacting the metallic brake lining.

19. The apparatus as claimed in claim 14, the insulation body and the metallic brake lining each having an opening for receiving a fastener for fastening the insulation body and the metallic brake lining to the piston.

20. The apparatus as claimed in claim 14, the insulation body and the metallic brake lining together defining a stepped exterior facing surface which is positionable within a stepped interior surface of the piston.

* * * * *